Oct. 21, 1952
L. B. MITCHELL
2,615,094
STATION IDENTIFICATION FOR PARTY LINES
Filed Dec. 10, 1949
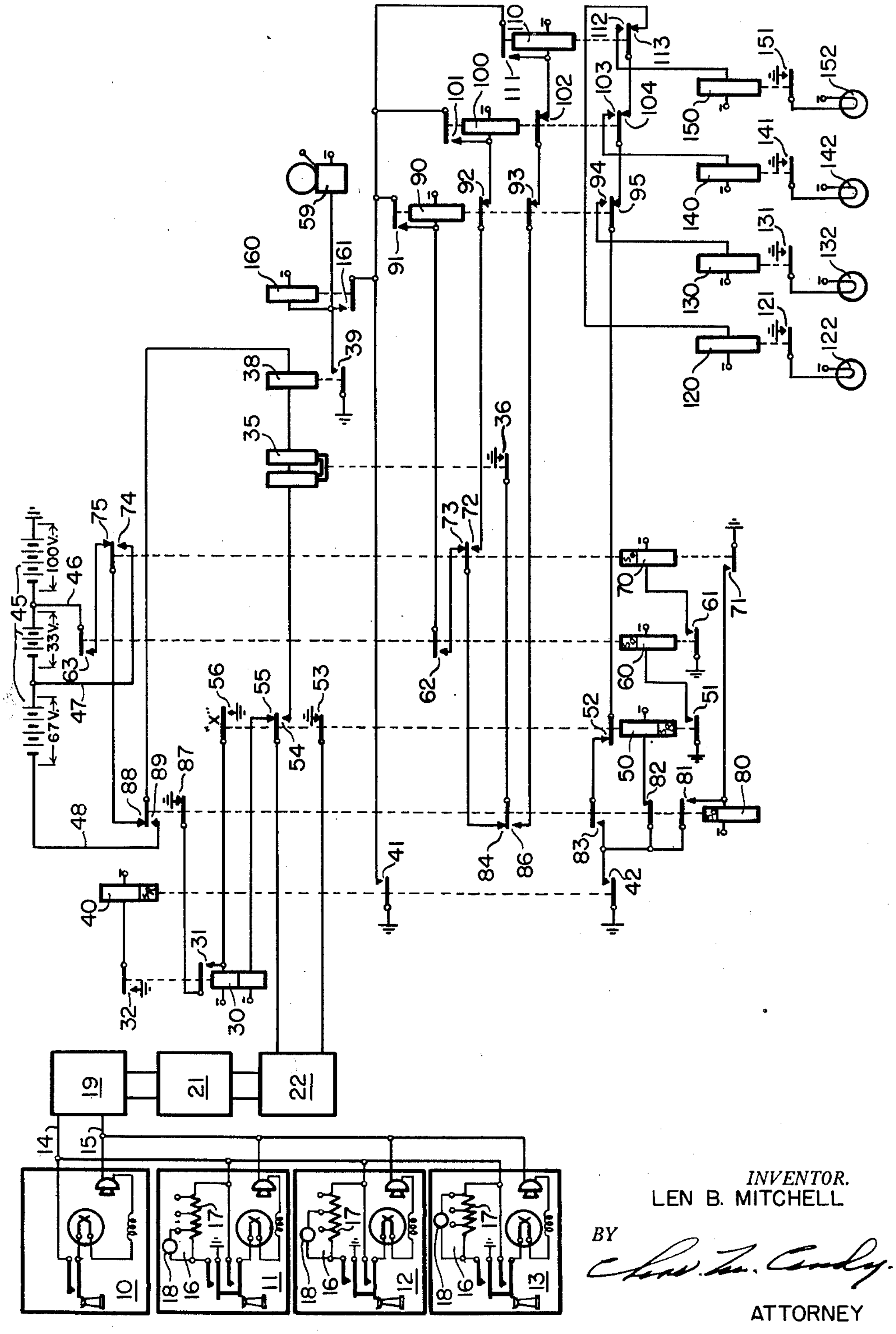
INVENTOR.
LEN B. MITCHELL
BY [signature]
ATTORNEY Patented Oct. 21, 1952 2,615,094

UNITED STATES PATENT OFFICE 2,615,094

STATION IDENTIFICATION FOR PARTY LINES

Len B. Mitchell, Wheaton, Ill., assignor to Automatic Electric Laboratories, Inc., Chicago, Ill., a corporation of Delaware Application December 10, 1949, Serial No. 132,240

11 Claims. (Cl. 179—17)

This invention relates in general to automatic telephone systems and more particularly to an apparatus and circuit whereby the calling subscriber on a multi-party telephone line may be identified.

It is an object of this invention to provide a simple and effective system for identifying the calling subscriber on a multi-party line.

Another object is to provide a party line identification system which may be readily utilized in automatic call recording systems.

A further object is to provide a party line identification system in which a plurality of voltage divider networks associated with subscribers' sets are adjusted to control the current passing through an indicating circuit so that a controlled voltage passing through one of the divider networks will act upon it to operate the indicating circuit.

Other objects of the invention will be apparent from the following specification taken in connection with the accompanying drawing.

Referring generally to the drawing, a plurality of subscribers' sets are shown at 10, 11, 12, and 13. These sets are connected in common to the lines 14 and 15. The subscriber's set 10 may be standard in every respect. However, each of the sets 11, 12, and 13 contains a voltage divider network.

Each voltage divider network consists of a resistance 17 connected in parallel with a nonlinear element such as a neon tube 18. With this parallel hookup when a low potential is applied across the resistance the neon tube is not conducting. As the potential across the resistance 17 is increased, a point is reached at which the neon tube 18 conducts and this serves as an effective short circuit for a part of resistance 17 and almost none of the current will pass through the part of resistance 17 which is short circuited.

The several resistance-neon tube combinations may be adjusted so that at a particular voltage one neon tube will begin to conduct; at a higher potential an additional neon tube may be adjusted for conductance; and at a still higher potential an additional neon tube may be adjusted for conductance. Thus, it is possible to adjust the resistance-neon tube combinations so that each step-wise increase in voltage will enable an additional neon tube to conduct provided the subscriber has removed his receiver from the hook to place the network including the particular tube in the circuit.

This principle is utilized in the present invention to indicate which subscriber on a party line is using his telephone. The system is well suited for use in connection with an automatic call recording equipment.

Lines 14 and 15 are shown passing through a line finder 19, primary selector 21 and a director hunter 22. These pieces of equipment are shown in block form since they are standard in every respect.

For the purpose of this invention the line finder 19 and the primary selector 21 may be of the well-known type of Strowger switch having vertical and rotary motions, while the director hunter 22, which is connected to the primary selector, may be of the well-known rotary type for selecting an idle identification apparatus. However, this invention is intended for use in toll ticketing systems of the type shown in the Ostline Patents 2,352,492, 2,409,063 and 2,385,228, issued June 27, 1944, October 8, 1946, and September 18, 1945, respectively, wherein switches of the type above described are employed.

The battery 45 may be used to supply varying voltage potentials, e. g., 100, 133, 200 volts, through the divider networks 16 by means of a series of taps 46, 47, and 48 which may be cut into the network circuit under the control of contacts of a group of serially operating relays 50, 60, 70, and 80. These serially operated relays set up a test cycle and prepare operating circuits for a series of registering relays 90, 100, and 110.

A marking relay 35 is located in the network circuit. This marking relay 35 is sensitive to the current flow thru it so that when one of the neon lamps begins to conduct marking relay 35 will be operated to complete a circuit to one of the registering relays 90, 100, and 110.

The operation of registering relays 90, 100, and 110 in turn controls the operation of a series of recording relays 120, 130, 140, and 150. As shown on the drawing, these recording relays control the operation of a series of signal lamps 122, 132, 142, and 152. In an automatic recording system these signal lamps would be replaced by automatic recording apparatus.

An overload relay 38 may be provided in order to prevent false operation and also to provide a warning signal such as a bell 59. A relay 160 which responds to the operation of overload relay 38 may be utilized to route calls to a manual board (not shown) when the overload relay is operated.

The operation of the apparatus will now be described in detail. Let it be assumed that the resistance-neon tube combination at subscriber's station 11 is adjusted so that the neon tube becomes conducting at an applied potential of 100 volts; at the subscriber's station 12 the parts are adjusted so that the neon tube responds to an applied potential of 133 volts; and at the subscriber's station 13 the parts are adjusted for operation of the neon tube shown upon an applied potential of 200 volts.

Let us now assume that the subscriber at station 13 lifts his receiver and operates the switchhook. Ground is now furnished through contacts 53, the subscriber's set, and contacts 55 for energization of the lower winding of line relay 30. Line relay 30 then locks up over its upper winding through contacts 87 and 31.

At its contacts 32, line relay 30 furnishes ground for the operation of slow release relay 40. Relay 40 operates and at its contacts 42 furnishes ground for the operation of slow release relay 50. At its contacts 41 relay 40 prepares locking ground for registering relays 90, 100, and 110.

When relay 50 is energized it furnishes ground through its contacts 51 for the operation of relay 60 which is slow to operate. At its contacts 54 it prepares a circuit connecting marking relay 35 through the voltage divider networks 16 and opens its contacts 55 to break the circuit to the lower winding of line relay 30. At its "X" contacts 56 it provides another locking circuit for relay 30.

When relay 60 is energized it closes its contacts 61 to provide ground for the operation of relay 70 which is slow to operate. At its contacts 62 it prepares a circuit for the operation of relay 90. At its contacts 63 it closes the following circuit for impressing a 100 volt potential upon the divider network 16 at subscriber's station 13; ground, a 100-volt portion of battery 45, tap 46, contacts 63, contacts 75, contacts 88, relay 38, marking relay 35, contacts 54, switch train 22, 21 and 19, network 16 at station 13, and ground. This 100-volt potential is not sufficient to operate the neon tube 18 at subscriber's station 13. Since the neon tube did not conduct, relay 35 was not operated and registering relay 90 was likewise not operated.

When relay 70 operates an instant after relay 60, it opens its contacts 73 and closes its contacts 72 to break the operating circuit for relay 90 and prepare an operating circuit for relay 100. It opens its contacts 75 to break the 100-volt circuit through battery 45 and tap 46 and closes contacts 74 to complete a 133-volt circuit through tap 47 of battery 45 and mark relay 35 to the voltage divider network 16. Since a 133-volt potential is not sufficient to operate the neon lamp 18 at subscriber's station 13 the marking relay 35 is not operated.

When relay 70 operated it closed its contacts 71 to furnish ground for the operation of relay 80 which is also a slow-to-operate relay. Upon the operation of relay 80 an instant after relay 70 operates, contacts 84 are opened to break the circuit previously prepared for the operation of relay 100 and contacts 86 are closed to prepare a circuit for the operation of relay 110. Contacts 87 are opened to break one locking circuit for line relay 30 which nevertheless remains operated because of ground furnished through "X" contacts 56. Contacts 88 open to break the 133-volt circuit and contacts 89 close to complete a 200-volt circuit through marking relay 35 and voltage divider network 16 over tap 48. Contacts 81 complete a locking circuit to grounded contact 42.

Since the resistance 17 and neon tube 18 at station 13 have previously been adjusted to enable the neon tube 18 to conduct at the 200-volt level, marking relay 35 will now be operated when the neon tube 18 at station 13 conducts.

The operation of marking relay 35 closes its contacts 36 which completes the following circuit for the operation of relay 110; ground, contacts 36, 86, 93, 102, relay 110, and battery to ground. Relay 110 operates and completes a locking circuit for itself through contacts 41 and 111. At its contacts 112 it prepares a circuit for the operation of indicating relay 150. At the time relay 80 operated it opened its contacts 82 to break the operating circuit of slow-release relay 50 which held operated for a short interval. At its contacts 87 it broke one of the locking circuits of line relay 30. Immediately upon the release of relay 50 the following circuit was completed for the operation of indicating relay 150: ground, contacts 42, 83, 52, 95, 104, 112, relay 150, and battery to ground.

The release of relay 50 closes its contacts 53 and 54 before opening its "X" contacts 56 to reestablish the loop circuit over the switch train for line relay 30. Line relay 30 is therefore maintained over the calling loop to hold relay 40 operated.

The operation of relay 150 closed its contacts 151 to complete an operating circuit for the indicator lamp 152. This lamp 152 provided visual evidence that station 13 initiated the call. An automatic means for recording the call could have been operated through contacts 151 as well as the lamp 152.

Assuming the voltage divider network 16 at station 12 had been adjusted to enable the neon tube 18 to conduct at 133 volts and further assuming that the call was initiated at this station rather than station 13 the course of operations would have been the same as that indicated above for station 13 except that the marking relay 35 would have been energized at the time the neon lamp at station 12 short circuited the part of the 133-volt current taken off battery 45 through lead 47 which passed through that portion of resistance 17 in parallel with neon tube 18. The operation of marking relay 35 would have completed a circuit through contacts 36, 84, 72, and 92 for the operation of registering relay 100. Registering relay 100 would have locked through contacts 41 and 101 and would have opened its contacts 102 to disable the operation of registering relay 110. Thus, when relay 80 would subsequently introduce the 200-volt potential from battery 45 through tap 48 the neon tube at station 12 would again be operated and marking relay 35 would again be energized but registering relay 110 would not be operated since the previous operation of relay 100 had disabled it at the contacts 102.

The operation of relay 100 would complete a circuit for the operation of recording relay 140 in a manner comparable to that previously described for the operation of relay 150 and lamp 142 would be operated to indicate that a call had originated at station 12.

If the call had originated at station 11 the neon tube therein would have become conducting at the time relay 60 introduced a 100-volt potential through tap 46. Marking relay 35 would have been energized to complete an operating circuit for registering relay 90 through contacts 36, 84, 73, and 62. Relay 90 would have locked up through contacts 41 and 91 and its contacts 92 and 93 would have been opened to disable the subsequent operation of relays 100 and 110. Contacts 94 would have been closed to complete a circuit for the operation of recording relay 130 and lamp 132 would have been operated to indicate that the call originated at station 11.

Relays 60, 70, and 80 are slow-to-operate relays with a preferred interval of about 200 milliseconds between energization and operation. Relays 40 and 50 are slow-to-release relays with a preferred interval of about 300 milliseconds between deenergization and restoration.

While voltage divider networks could have been included at all of the subscribers' stations, the interests of economy may be served by eliminating the network from one of the stations without interfering with the operation of the system. There is no voltage divider network at station 10. Consequently, if a call originates at this station marking relay 35 will not be operated nor will registering relays 90, 100, and 110. However, at the time relay 50 releases recording relay 120 will be operated through the following circuit: ground, contacts 42, 83, 52, 95, 104, 113, relay 120, and battery to ground. The operation of lamp 122 will then indicate that the call originated at station 10. An overload relay 38 is provided for protective purposes. In the event of an overload through the circuit including marking relay 35 such as might be provided by faulty lines relay 38 will operate and close its contacts 39 to complete a circuit for the operation of a warning bell 59. The closing of contacts 39 will also complete a circuit for the operation of relay 160. The operation of relay 160 may be utilized (by a circuit not shown) to transfer operations to manual control for identification on such faulty lines in any well-known manner.

While only a four party line is shown, it is obvious that additional parties could be accommodated by an enlargement of the application of the principles already disclosed in this specification.

While the preceding description has reference to a single embodiment of the invention, this should not be construed to limit the scope of the invention other than as necessitated by the appended claims.

I claim as my invention:

1. In a telephone system, a two-conductor line having at least two subscribers' stations, means for connecting one of said stations to said line, a network including a non-linear element at at least two of said stations, said networks being adjusted to allow said non-linear elements to conduct, each at a different applied voltage, a source of current supplying different voltage of unvarying polarity which will render said non-linear elements conductive, means for applying said voltages sequentially to said line beginning with the lowest voltage, means for indicating which one of the non-linear element is connected to said line, and means operated responsive to the passage of current through one of said non-linear elements for operating said last mentioned means.

2. In a telephone system, a two-conductor line having at least two subscribers' stations, means for connecting one of said stations to said line, a network including a gaseous discharge tube at at least two of said stations, sources of voltage of unvarying polarity which when applied to said lines will render said gaseous discharge tubes conducting, said networks being adjusted to allow said gaseous discharge tubes to conduct, each at a different applied voltage, means for applying said voltages sequentially to said line beginning with a low voltage, means for indicating which gaseous discharge tube is connected to said line and means operated responsive to the passage of current through one of said gaseous discharge tubes for operating said last mentioned means.

3. In a telephone system, a two-conductor line having a plurality of subscribers' stations, means for connecting one of said stations to said line, a network including a gaseous discharge tube at all except one of said stations, a source of a plurality of voltages of unvarying polarity, said networks being adjusted to allow said tubes to conduct upon application of different voltages, means for applying said plurality of voltages sequentially to said line at increasing voltage levels, and means for indicating the voltage level which rendered one of said tubes conducting, and means for indicating that the station without a network is connected to said line, upon failure of all of the said gaseous discharge tubes to conduct.

4. In a telephone system, a two-conductor line having a plurality of subscribers' stations, means for connecting one of said stations to said line, a network including a gaseous discharge tube at all except one of said stations, a source of a plurality of voltages of unvarying polarity, said networks being adjusted to allow each gaseous discharge tube to conduct at a different applied potential, means for applying said plurality of voltages sequentially to said line, and means including a marking relay for indicating the applied voltage which rendered one of said tubes conducting, and for indicating the connection of the station without a network.

5. In a telephone system, a two-conductor line having a plurality of subscribers' stations, means for connecting one of said stations to said line, a voltage divider network at at least two of said subscribers' stations, each of said voltage divider networks comprising a gaseous discharge tube and resistance in parallel, said tube and resistance combinations being adjusted to enable said tubes to conduct each at a different voltage level, a source of voltages at said levels which will render said tubes conducting, all said voltages being of constant polarity, means for applying said voltages sequentially to said line, means to indicate which gaseous discharge tube is connected to said line and means operated responsive to the passage of current through one of said gaseous discharge tubes for operating said last mentioned means.

6. In a telephone system, a two-conductor line having a plurality of subscribers' stations, means for connecting one of said stations to said line, a voltage divider network at each subscribers' station, each of said voltage divider networks comprising a gaseous discharge tube and resistance in parallel, said tube and resistance combinations being adjusted to enable said tubes to conduct each at a different voltage level, a source of voltages at said levels which will render said tubes conducting, all said voltages being of constant polarity, a marking relay responsive to current flow through any one of said tubes, a circuit connecting said marking relay to said line, means for including said voltages sequentially in said circuit in the order of increasing potential, and means responsive to the operation of said marking relay for indicating which of said tubes is connected to said line.

7. In a telephone system, a two-conductor line having a plurality of subscribers' stations, means for connecting one of said stations to said line, a voltage divider network at at least two of said subscribers' stations, each of said voltage divider networks comprising a gaseous discharge tube and resistance in parallel, sources of voltage of unvarying polarity, said tube and resistance combinations being adjusted to enable said tubes to conduct, each tube conducting upon application of a particular voltage, said particular voltage being different for each tube, a marking relay operable in response to current flow through any one of said tubes, a circuit connecting said marking relay to said line, means for including said voltages in said circuit in the order of increasing potential, and a series of registering relays responsive to the operation of said marking relay for indicating which of said tubes is connected to said line.

8. In a telephone system, a two conductor line having a plurality of subscribers' stations, means for connecting one of said stations to said line, a voltage divider network at all except one of said subscribers' stations, each of said voltage divider networks comprising a gaseous discharge tube and resistance in parallel, sources of voltage at potentials which will render said tubes respectively conductive, said tube and resistance combinations being adjusted to be conductive for different applied voltages, a marking relay operable in response to current flow through any of said tubes, a circuit connecting said marking relay to said line, a relay controlled test cycle for including said voltages in said circuit in the order of increasing potential, and for testing the station not having the network included therein, a series of registering relays operated in accordance with the operation or nonoperation of said marking relay for indicating which of said stations is connected to said line, and indicator means controlled by said registering relays.

9. In a telephone system, a two-conductor line having a plurality of subscribers' stations, means for connecting one of said stations to said line, a voltage divider network at all except one of said subscribers' stations, each of said voltage divider networks comprising a gaseous discharge tube and a resistance connected in parallel, sources of voltages of unvarying polarity, said tube and resistance combinations being adjusted in value to respond to a range of voltage steps at each one of which one of said tubes will begin to conduct thereby short circuiting its associated resistance, means for applying said voltages stepwise to said line, recording means, and means including a marking relay for actuating said recording means to identify the subscriber's station at which the tube became conducting upon the application of the voltage to which that station was adjusted, and means dependent upon the nonoperation of the marking relay to indicate through said recording means that the station without a network is connected to the line.

10. In a telephone system, a two-conductor line having a plurality of subscribers' stations, a voltage divider network at each of said subscribers' stations, each of said voltage divider networks comprising a resistance and gaseous discharge tube connected in parallel, sources of voltage of unvarying polarity, the values of said resistances and gaseous discharge tubes being adjusted to enable said gaseous discharge tubes to conduct when a particular voltage is applied to their parallel resistances thereby short circuiting said resistances, the divider networks being adjusted to enable their gaseous discharge tubes to be conductive to predetermined values of voltage, each network being responsive to a different voltage value, a line relay, a circuit connecting said line relay to each subscriber's station through said divider network at said station, said line relay being operable when said circuit is completed, a slow-release relay operated by said line relay, a testing cycle comprising a plurality of sequentially operated relays, and a circuit connecting said sources of voltage through contacts of said sequentially operating relays to said line, the voltages applied to the line changing stepwise as said sequentially operating relays are energized, a marking relay in the circuit connecting said voltages to said line, said marking relay being operable only when the gaseous discharge tube in one of the voltage divider networks short circuits its associated resistance, and means responsive to operation of said marking relay for identifying the subscriber's station at which said tube conducted.

11. In a telephone system, a two-conductor line having a plurality of subscribers' stations, means for connecting one of said stations to said line including a subscribers switch hook, a voltage divider network at all except one of said subscribers' stations, each of said voltage divider networks comprising a gaseous discharge tube and a resistance connected in parallel therewith, sources of voltage of unvarying polarity, said tube and resistance combinations being so adjusted that each network is responsive to a different applied voltage, a line relay operated by the lifting of one of said subscribers' switch hooks, a slow-release relay operated in response to operation of said line relay, a plurality of sequentially operating relays operated in response to operation of said slow-release relay, a circuit connecting said voltage sources to said line through contacts of said sequentially operating relays whereby operation of said relays changes the voltage applied to said line stepwise, a marking relay in the circuit connecting the voltages source to said line, said marking relay operating only when the current passing therethrough has reached a particular level due to the conducting of one of said neon lamps and consequent short circuiting of its parallel resistance, a series of registering relays equal in number to said voltage dividers, a registering relay circuit connecting said registering relays through contacts of said sequentially operating relays and said marking relay, each of said registering relays having contacts which, upon energization of said relay, disable the operation of succeeding registering relays, one of said registering relays being operated when said marking relay operates coincidentally with one of said sequentially operating relays, and means responsive to said registering relays for determining which of said gaseous discharge tubes is connected to said line during the stepwise application of said voltages to said line, and means for registering the connection of the station without a network when none of the network stations has caused the operation of the marking relay.

LEN B. MITCHELL.

REFERENCES CITED

The following references are of record in the file of this patent:

UNITED STATES PATENTS

| Number | Name | Date |
|---|---|---|
| 1,663,747 | Bascom | Mar. 27, 1928 |
| 1,857,827 | Stacy | May 10, 1932 |
| 2,306,173 | Logan | Dec. 22, 1942 |
| 2,315,000 | Logan | Mar. 30, 1943 |